United States Patent
Tysinger et al.

(10) Patent No.: US 6,753,029 B1
(45) Date of Patent: *Jun. 22, 2004

(54) SOYBEAN OIL PROCESS

(75) Inventors: Jerry E. Tysinger, Kenansville, NC (US); Jerry F. Richmond, Raleigh, NC (US); Robert B. Dawson, Kinston, NC (US); Walter E. Farr, Collierville, TN (US)

(73) Assignee: Carolina Soy Products, Inc., Warsaw, NC (US)

( * ) Notice: Subject to any disclaimer, the term of this patent is extended or adjusted under 35 U.S.C. 154(b) by 127 days.

This patent is subject to a terminal disclaimer.

(21) Appl. No.: 10/066,250

(22) Filed: Jan. 31, 2002

Related U.S. Application Data

(63) Continuation-in-part of application No. 09/775,105, filed on Feb. 1, 2001, now Pat. No. 6,511,690.

(51) Int. Cl.⁷ ............................. C11B 1/00; C11B 1/10; C11B 3/00
(52) U.S. Cl. ...................... 426/489; 426/634; 426/492; 554/9
(58) Field of Search ................................. 426/634, 489, 426/492; 554/9

(56) References Cited

U.S. PATENT DOCUMENTS

| | | |
|---|---|---|
| 3,758,532 A * | 9/1973 | Gibble ....................... 554/191 |
| 4,049,686 A | 9/1977 | Ringers et al. |
| 4,089,880 A | 5/1978 | Sullivan |
| 4,255,346 A | 3/1981 | Kock |
| 4,267,118 A | 5/1981 | Trueblood et al. |
| 4,515,726 A | 5/1985 | Sullivan |
| 4,584,141 A | 4/1986 | Paulitz et al. |
| 4,698,185 A | 10/1987 | Dijkstra et al. |
| 4,808,426 A | 2/1989 | Strop et al. |
| 4,915,972 A * | 4/1990 | Gupta et al. ................. 426/598 |
| 4,944,954 A | 7/1990 | Strop et al. |
| 5,239,096 A | 8/1993 | Rohdenburg et al. |
| 5,278,325 A * | 1/1994 | Strop et al. .................... 554/12 |
| 5,362,893 A | 11/1994 | Muylle et al. |
| 5,516,923 A * | 5/1996 | Hebert et al. .................. 554/12 |
| 5,516,924 A | 5/1996 | van de Sande et al. |
| 5,981,781 A | 11/1999 | Knowlton |
| 6,033,706 A | 3/2000 | Silkeberg et al. |
| 6,511,690 B1 * | 1/2003 | Tysinger et al. ............. 426/489 |

* cited by examiner

Primary Examiner—Anthony Weier
(74) Attorney, Agent, or Firm—MacCord Mason PLLC

(57) ABSTRACT

A solvent extraction free, caustic refining free, process for producing refined soybean oil from soybeans is described in which soybeans, after cleaning, cracking and dehulling, are crushed in less than 60 seconds while heating the soybeans to a frictionally generated temperature of from about 300° F. to about 370° F. Free fatty acids are then removed through physical refining, instead of previously employed caustic refining, since the low level of nonhydratable phospholipids does not create undesirable flavors during the physical refining process. The resultant oil exhibits a significantly greater frylife that non-hydrogenated soybean oil produced by solvent extraction and caustic refining.

18 Claims, No Drawings

SOYBEAN OIL PROCESS

This application is a continuation-in-part of U.S. patent application Ser. No. 09/775,105, filed Feb. 1, 2001 now U.S. Pat. No. 6,511,690.

BACKGROUND OF THE INVENTION (1) Field of the Invention

The present invention relates generally to a process for extracting and refining soybean oil and to the resultant product, and in particular to the production of non-hydrogenated soybean oil having an acceptable frylife similar to that of partially hydrogenated soybean oil.

(2) Description of the Prior Art

Soybean oil production involves several steps that are necessary to render the soybean oil suitable for human consumption. These production steps may be broadly characterized as 1) soybean preparation, 2) oil extraction, and 3) oil refining. Soybean preparation generally includes the steps of cleaning, drying, cracking, and dehulling.

The great majority of commercial soybean oil production processes extract or separate the oil from the soybean meal by a process known as solvent extraction. In the solvent extraction process, the prepared beans are first flaked to provide a large surface area. A solvent, commonly hexane, is then pumped through the soybean flakes to dissolve the oil in the hexane, separating approximately 99.5% of the oil from the meal. The hexane is then separated from the oil and recycled.

The crude oil resulting from the solvent extraction must then be subjected to additional treatments, collectively called "refining", to remove various materials in order for the oil to be suitable for consumption. These materials include hydratable and non-hydratable phospholipids, free fatty acids, and various color and flavor components. Crude soybean oil contains phosphorous compounds called hydratable phospholipids, and small amounts of calcium and magnesium that complex with a portion of the phospholipids to form non-hydratable phospholipids. Hydratable phospholipids are normally removed by a process known as "degumming", in which the oil is agitated or otherwise intimately combined with water to precipitate gums from the oil. The gums are then removed by centrifugation.

These precipitated gums can be used as a feed additive, or evaporated to remove moisture. The end product, lecithin, has various end uses such as food emulsifier. The degummed oil is dried under vacuum to remove any water. Removal of non-hydratable phospholipids is considerably more difficult and expensive, requiring further chemical treatment, typically chemical refining, to break the chemical bonds between the calcium or magnesium ions and the phospholipids, followed with extensive bleaching of the oil.

In most processes, free fatty acids are removed from the oil by a process known as caustic refining, also called chemical or alkali refining, in which the oil is mixed with a caustic material, such as sodium or potassium hydroxide, which undergoes a saponification reaction with the acids, forming soaps that are then removed by centrifugation. Non-hydratable phospholipids are removed along with the free fatty. acids. Chemical refining soybean oil is an expensive process, requiring a large investment in capital equipment. In addition, a significant quantity of the oil is captured by the soaps, adversely affecting oil yield. Also, the caustic refining process produces soapstock, which has little commercial value, and it is difficult to dispose of without environmental problems.

Conventional refining processes also involve some bleaching of the soybean oil to remove color pigments that adversely affect the color of the oil. Finally, chemicals that add flavors to the oil are removed by a process known as "deodorization", which is essentially a form of physical distilling, in which the oil is subjected to high temperatures under a vacuum for a short period of time, which is sufficient to remove the flavor-causing components, but insufficient to break down non-hydratable phospholipids.

A major use of soybean oil is in deep frying of foods, such as chicken, fish, french fries, etc., either in the production of pre-cooked packaged foods, or in the preparation of foods for on-premise or carry-out consumption in restaurants and other all commercial establishments. In deep frying, a container or vat is filled with cooking s oil that is heated to a frying temperature, normally around 350° to 375° F. The uncooked food is then immersed in the hot oil for a sufficient time to effect the desired cooking, and then removed for serving or packaging.

Some of the oil in the vat is lost during cooking due to absorption and evaporation. The oil is replenished by adding fresh oil to the oil remaining in the vat, and the oil is reused. This procedure is repeated until the oil becomes unusable, as indicated by darkening of the oil and the food cooked in the oil, and/or by the observance of an undesirable taste or appearance in the food being cooked.

Non-hydrogenated soybean oil produced by solvent extraction and caustic refining is unsuitable for use in commercial frying operations due to its limited frylife. Such oil has a maximum frylife of only about 4–5 fry cycles, a cycle being the frying of one batch of food. Replacement of the oil at this frequency is uneconomical. In order to extend the frylife of soybean oil to a commercially acceptable number of fry cycles, preferably at least about 30 fry cycles, refined soybean oil is normally at least partially hydrogenated. Hydrogenation of solvent extracted, caustic refined soybean oil reduces the percentage of C 18:3 acids. It is commonly believed that the presence of C 18:3 acids contribute to the rapid deterioration, and thereby limited frylife, of solvent extracted, caustic refined soybean oil.

Saturation or hydrogenation of C 18:3 acids, however, reduces the healthful properties of soybean oil. Therefore, attempts have also been made to reduce the C 18:3 or linolenic acid content of soybean oil by genetically modifying the soybean, thereby enabling the production of non-hydrogenated soybean oil having a C 18:3 content of significantly less than the 6–8% by weight C 18:3 acids, based on the total content of free fatty acids, found in conventional soybeans. This approach, to date, has met with at most limited success.

Thus, there remains a significant commercial need for a soybean oil that has an acceptable frylife, preferably at least 30 fry cycles, without the loss in healthful benefits resulting from hydrogenation as heretofore required. Non-hydrogenated soybean oil with a commercially acceptable frylife would enable commercially economical frying of foods while retaining the healthful benefits of the soybean oil.

SUMMARY OF THE INVENTION

While the reasons are not fully understood, it has been found that an non-hydrogenated soybean oil having a commercially acceptable frylife can be produced by a combination of mechanical extraction of the oil from the soybean meal combined with physical refining of the crude oil. While the resultant non-hydrogenated oil has a C 18:3 content similar to non-hydrogenated oil produced by solvent extraction and caustic refining, the frylife of the oil produced by the present process is considerably greater than that of non-hydrogenated oil produced by solvent extraction and caustic refining.

Mechanical oil extraction and physical refining are known separately but have not been heretofore used in combination, and these resultant properties of the resultant oil have not been appreciated. A form of mechanical oil separation has been practiced in the prior art. In the prior art process known as expelling, the dehulled beans are extruded through a screw press to frictionally heat the beans and rupture the oil cells. Within the screw press, the beans are subjected to high pressures and frictionally-generated high temperatures for a short period. The crushed, oil-containing meal is then pressed to separate most of the oil from the meal. This process has rarely been used to process soybeans due to the fact that about 25% of the soybean oil is left in the meal.

Physical refining has heretofore been used for oils that are naturally low in non-hydratable phospholipids, such as lauric oils, particularly palm oil. In physical refining, the oil is vacuum distilled at high temperatures, e.g., from about 450° F. to about 500° F., to separate more volatile components from the oil. This process is used to remove various flavor components, and will also remove free fatty acids. However, the process has not been viable for removing free fatty acids from oils such as soybean oil, which contains higher levels, i.e., more than 20 ppm based on elemental phosphorous content, of non-hydratable phospholipids. The high temperatures required for physical refining tend to break down the non-hydratable phospholipids that are present in the soybean oil, producing chemical compounds that cause an unacceptable flavor and color.

In the present process, the soybean oil is mechanically separated from prepared soybeans by first rapidly heating the beans to a temperature of from about 300° F. to about 370° F., preferably from about 315° F. to about 335° F., followed by mechanically pressing the oil from the beans. Surprisingly, it has been found that the percentage of non-hydratable phospholipids in the crude oil is considerably lower, e.g., less than 20 ppm based on the weight of elemental phosphorous, if the beans are heated to within this temperature range. Care should be exercised in using temperatures above about 350° F., since the oil will tend to scorch, causing an off taste in the final product and a darker color. Also, heating the oil to less than 300° F. will fail to destroy sufficient trypsin inhibitors in the meal.

The time during which the soybeans are heated is also important to the invention. Heating of the beans to the desired temperature in at least 10 seconds has been found to achieve maximum rupture of the oil cells, and thus maximum extraction of oil from the soybeans. However, heating of the beans for longer than about 60 seconds degrades the desirable characteristics of the oil. Therefore, the time to heat the beans to the desired temperature should be less than about 60 seconds, and preferably from about 10 to about 30 seconds.

Desirably, the beans are crushed during or after heating to assist in freeing the oil from the remainder of the soybeans, i.e., the meal. One way to simultaneously heat and crush the beans is to extrude the beans through an extruder in which the beans are subjected to high pressures that crush the beans while creating frictionally heating of the beans.

Mechanical pressing of the beans removes only about 74% to about 76% of the oil from the beans, leaving a soybean meal that includes from about 6% to 7% soybean oil. However, this meal has a substantially higher nutritional value than soybean meal from conventional solvent extraction, with the resultant higher selling prices at least partially offsetting the oil loss. While not being restricted to any particular theory, it is believed that the oil residue left in the meal may include components that contribute to the limited frylife of solvent extracted, caustic refined soybean oil.

The crude soybean oil is then degummed by intimately mixing the crude soybean oil with water, which may contain citric acid or a similar organic acid, to form gums of the hydratable phospholipids, which are then removed from the crude oil, e.g., by centrifuging. The degummed oil is then bleached with bleaching materials, such as clay, silica gel, and if needed for damaged beans, sodium metasilicate. The oil is then vacuum dried and filtered.

At this stage, the oil is a useful product known as refined and bleached oil. However, for many applications it is desirable to further process the oil to remove free fatty acids and components that contribute to the color and flavor of the oil. In the present process, it is possible to remove the free fatty acids without the caustic refining required in prior art processes. Instead, the free fatty acids are removed at the same time as the flavor and color components are removed during physical refining.

As noted earlier, removal of free fatty acids by physical refining has not been feasible due to the large amount of non-hydratable phospholipids in the oil, which degraded under the high temperatures required for physical distillation. In the present process, however, the amount of non-hydratable phospholipids is generally less than 2.0 ppm based on the weight of elemental phosphorous in the compounds as a result of the mechanical extraction. After silica treatment and bleaching, the phosphorous content will be less than 1 ppm. This insignificant amount of phosphorous has no affect on oil flavor or stability.

During the physical refining stage of the invention, free fatty acids and flavor components are removed from the oil by heating the oil in a distillation column to a temperature of from about 450° F. to about 500° F., and preferably for from about 460° F. to about 480° F., to distill off the free fatty acids and flavor materials. By industry standards, the final oil should contain less than about 0.05% free fatty acids.

DETAILED DESCRIPTION OF THE INVENTION

Various methods may be employed to heat and crush the soybeans. By way of example, cleaned and dehulled soybeans were extruded through an extruder having a 15 inch conduit, with the dwell time within the conduit being about 30 seconds. During extrusion, the beans were mechanically crushed and frictionally heated to a temperature of 315° F. to 335° F. Crushed soybeans exiting the extruder were then pressed to separate most of the oil from the soybean meal. The separated oil was screened to remove remaining solids prior to the refining process.

The crude soybean oil was then degummed with water containing citric acid and centrifuged to remove gums of the hydratable phospholipids. The degummed oil was then bleached, vacuum dried and filtered. The oil was then physically refined by heating the oil in a distillation column to a temperature of from about 460° F. to about 480° F., to distill off the free fatty acids and flavor materials. The frylife of the mechanically extracted and physically refined oil was then compared to partially hydrogenated soybean oil.

EXAMPLE

Separate fryers were filled with a leading commercial, partially hydrogenated frying oil (FryMax Supreme), and with non-hydrogenated soybean oil prepared in accordance with the present process. The weight of oil in each fryer was 7000 g, with fresh makeup oil being added each day during the test to replace oil lost through evaporation and absorption. The oils were maintained at a frying temperature of 350° F. for eight hours each day. Ten batches of breaded chicken patties were cooked each day, with each batch containing 800 g. Frying time was 3.5 minutes with a 3 minutes drain time between batches. Consumer tests were conducted on batches #1, #15 and #30. The fried chicken patties were then ranked on a scale of 1–10 by a taste panel (10=like very much, 5=like somewhat, 1=dislike very much). The following results were found:

| Batch # | Present Oil | Commercial Oil |
|---|---|---|
| 1 | 9 | 9 |
| 15 | 8 | 7 |
| 30 | 7 | 5 |

The commercial patties in batch #30 were observed to be darker and show burnt spots. These deficiencies were not observed in the patties fried in the present oil.

As seen from the following comparison, the C 18:3 content of the non-hydrogenated oil resulting from the present process is in the range of at least 6% up to 8% of the total fatty acids, and the total trans fatty acid content is less than about 1%. In comparison, the partially hydrogenated soybean oil is substantially lower in C 18:3 acids, and much higher in trans fatty acid content:

| FAC (% w/w) | Partially Hydrogenated Soybean Oil | Present Process Soybean Oil |
|---|---|---|
| C 14:0 | 0.1 | 0.1 |
| C 16:0 | 11.2 | 10.9 |
| C 16:1 | 0.1 | 0.1 |
| C 18:0 | 7.2 | 3.7 |
| C 18:1t | 8.2 | — |
| C 18:1c | 39.9 | 24.7 |
| C 18:2t | 4.4 | 0.4 |
| C 18:2c | 27.1 | 53.5 |
| C 18:3t | 0.4 | 0.3 |
| C 18:3c | 1.2 | 6.0 |
| C 20:0 | 0.1 | 0.4 |
| Total Trans (%/wt.) | 13.0 | 0.7 |

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A solvent extraction free, caustic refining free, process for producing soybean oil from soybeans comprising:
   a) heating said soybeans to at least 300° F.;
   b) mechanically pressing said soybeans to separate soybean oil from soybean meal; and
   c) heating said soybean oil to a temperature of from about 450° F. to about 500° F. under a vacuum to remove free fatty acids from said soybean oil.

2. The process of claim 1, wherein said soybeans are heated to at least 300° F. in less than about 60 seconds.

3. The process of claim 1, wherein said soybeans are crushed while being frictionally heated to a temperature of from about 300° F. to about 370° F.

4. The process of claim 1, further including degumming said soybean oil following pressing.

5. The process of claim 1, further including bleaching said soybean oil following pressing.

6. The process of claim 1, including the step of crushing said soybeans while said soybeans are being heated.

7. The process of claim 1, wherein said soybean oil is heated under a vacuum at a temperature of from about 460° F. to about 480° F.

8. A solvent extraction free, caustic refining free, process for producing non-hydrogenated soybean oil having an improved frylife comprising:
   a) heating said soybeans to a temperature of at least 300° F. in less than 60 seconds;
   b) crushing said soybeans to form a mixture of soybean meal and soybean oil;
   C) pressing said mixture to separate soybean oil from said soybean meal; and
   d) heating the soybean oil to a temperature of from about 450° F. to about 500° F. under a vacuum to remove free fatty acids from said soybean oil.

9. The process of claim 8, wherein said soybean oil is degummed and bleached after pressing.

10. The process of claim 8, wherein said soybean oil is crushed while frictionally heating said soybeans.

11. The process of claim 8, wherein said soybeans are heated to a temperature of from about 315° F. to about 335° F.

12. The process of claim 8, wherein said soybeans are crushed while being frictionally heated.

13. The process of claim 12, wherein said soybeans are crushed in less than 30 seconds, while being frictionally heated to a temperature of from about 315° F. to about 335° F.

14. The process of claim 8, wherein said soybean oil is heated under a vacuum at a temperature of from about 460° F. to about 480° F.

15. A solvent extraction free, caustic refining free, process for producing non-hydrogenated soybean oil having a frylife of at least 30 fry cycles comprising:
   a) crushing said soybeans in less than 30 seconds while frictionally heating said soybeans to a temperature of at least about 300° F. to form a mixture of soybean meal and soybean oil containing free fatty acids;
   b) pressing said mixture to separate soybean oil from said mixture; and
   c) heating said soybean oil to a temperature of from about 450° F. to about 500° F. under a vacuum to remove free fatty acids from said soybean oil.

16. The process of claim 15, wherein said soybeans are frictionally heated to a temperature of from about 315° F. to about 335° F.

17. The process of claim 15, wherein said soybean oil is heated under a vacuum at a temperature of from about 460° F. to about 480° F.

18. The process of claim 15, further including degumming and bleaching said soybean oil following pressing.

* * * * *